United States Patent
Gopal et al.

(10) Patent No.: US 7,961,877 B2
(45) Date of Patent: Jun. 14, 2011

(54) FACTORING BASED MODULAR EXPONENTIATION

(75) Inventors: Vinodh Gopal, Westboro, MA (US);
Erdinc Ozturk, Worcester, MA (US);
Matt Bace, North Andover, MA (US);
Wajdi Feghali, Boston, MA (US);
Robert P. Ottavi, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 1167 days.

(21) Appl. No.: 11/610,886

(22) Filed: Dec. 14, 2006

(65) Prior Publication Data

US 2008/0144810 A1     Jun. 19, 2008

(51) Int. Cl.
*H04L 9/30* (2006.01)
*H04L 9/28* (2006.01)
*H04L 9/00* (2006.01)
*G06G 7/16* (2006.01)

(52) U.S. Cl. ............. 380/30; 380/28; 380/44; 709/250; 713/192

(58) Field of Classification Search ............. 380/30
See application file for complete search history.

(56) References Cited

U.S. PATENT DOCUMENTS 7,461,115 B2 * 12/2008 Eberle et al. .......... 708/491
7,809,133 B2 * 10/2010 Dupaquis et al. .......... 380/28
2010/0023572 A1 * 1/2010 Dupaquis et al. .......... 708/492

OTHER PUBLICATIONS

Peeters, E., et al, 'XTR Implementation on Reconfigurable Hardware', 2004, UCL Crypto Group, entire document, http://www.dice.ucl.ac.be/crypto/services/download/publications.pdf. b04fc569098cb5b.7064663139302e706466.pdf.*

* cited by examiner

*Primary Examiner* — Edan Orgad
*Assistant Examiner* — Ronald Baum
(74) *Attorney, Agent, or Firm* — Grossman, Tucker, Perreault & Pfleger PLLC

(57) ABSTRACT

The present disclosure provides a system and method for performing modular exponentiation. The method may include dividing a first polynomial into a plurality of segments and generating a first product by multiplying the plurality of segments of the first polynomial with a second polynomial. The method may also include generating a second product by shifting the contents of an accumulator with a factorization base. The method may further include adding the first product and the second product to yield a first intermediate result and reducing the first intermediate result to yield a second intermediate result. The method may also include generating a public key based on, at least in part, the second intermediate result. Of course, many alternatives, variations and modifications are possible without departing from this embodiment.

22 Claims, 6 Drawing Sheets

FACTORING BASED MODULAR EXPONENTIATION

FIELD

The present disclosure describes a system and method for modular exponentiation.

BACKGROUND

Encryption algorithms may be classified as either private-key or public-key. Private-key encryption refers to an encryption method in which both the sender and receiver share the same key. Public-key encryption involves two different but related keys. One key is used for encryption and one for decryption. Many of today's encryption techniques utilize a public-key/private-key pair. Most public-key algorithms, such as Rivest, Shamir, Adelman (RSA) and Diffie-Helman, perform extensive computations that involve the modular exponentiation of extremely large numbers. These computationally expensive operations are critical in secure protocols such as the Internet Key Exchange (IKE) and Secure Sockets Layer (SSL). Existing modular exponentiation operations utilize vast memory resources, such as register files, and require an excessive amount of area.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Public key exchange protocols may use a range of keys having different bit lengths. For example, some key exchange protocols may use keys having bit lengths of 1024, 2048, 3072, 4096, 8192 etc. The larger key sizes may require the use of various techniques, such as Karatsuba-Ofman multiplication, Barrett's reduction and/or modified Barrett's reduction, which may be used to perform mathematical operations on very large numbers. A description of these techniques may be found in *The Handbook of Applied Cryptography* authored by Alfred Menezes et al., published Jan. 1, 1997 by CRC press. During a public key negotiation, for example, between two parties over an untrusted network, each party may generate a public key. The security strength of the key is typically a function of the size (i.e., bit length) of the key. To generate a key, each party may need to solve an equation of the form: $x = g^a \mod m$. Given two integers, $g^a$ and m, $g^a \mod m$ yields the remainder (r) of the division of $g^a$ by m. This calculation may be difficult given the large size of the operands. The computation of the exponent $g^a$, where base g is an element of a finite group and the exponent a is a non-negative integer, may require an efficient method for multiplying two elements in the finite group. While this may be accomplished using conventional multiplication techniques, these techniques may require an excessive amount of memory space, especially as increased security demands causes key lengths to increase.

Generally, this disclosure describes a method for performing modular exponentiation on large operands. In one embodiment the method described herein may optimize processing performance on modular exponentiation operations using a decomposition of multiplications and an exemplary factoring technique. The operations described herein may be used to reduce the amount of register files required and thus minimize the amount of area consumed (e.g., on an integrated circuit).

Figure 1:
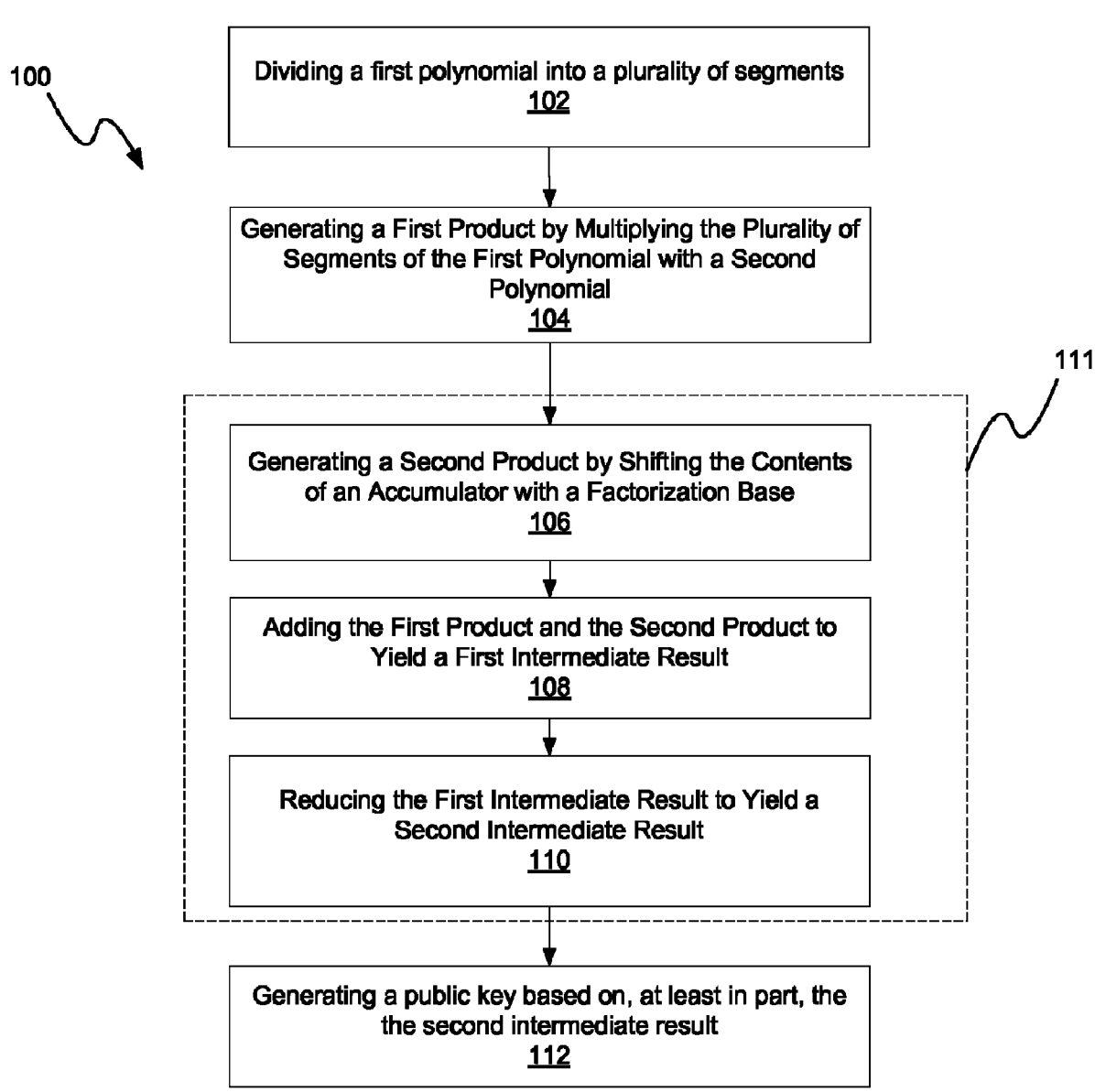
FIG. 1 is a flowchart showing operations in accordance with one exemplary embodiment of the present disclosure.

FIG. 1 shows a flowchart 100 illustrating one method consistent with the present disclosure. Flowchart 100 depicts operations that may be used to perform modular exponentiation on vectors of arbitrary length (e.g., an array of words representing large integers). Operations may include dividing a first polynomial into a plurality of segments (102). Operations may also include generating a first product by multiplying the plurality of segments of the first polynomial with a second polynomial (104). Operations may further include generating a second product by shifting the contents of an accumulator with a factorization base (106). Operations may additionally include adding the first product and the second product to yield a first intermediate result (108) and reducing the first intermediate result to yield a second intermediate result (110). Operations may further include generating a public key based on, at least in part, the second intermediate result (112). In some embodiments 106-110 may be performed in an iterative loop until a final result is obtained (111).

Figure 2:
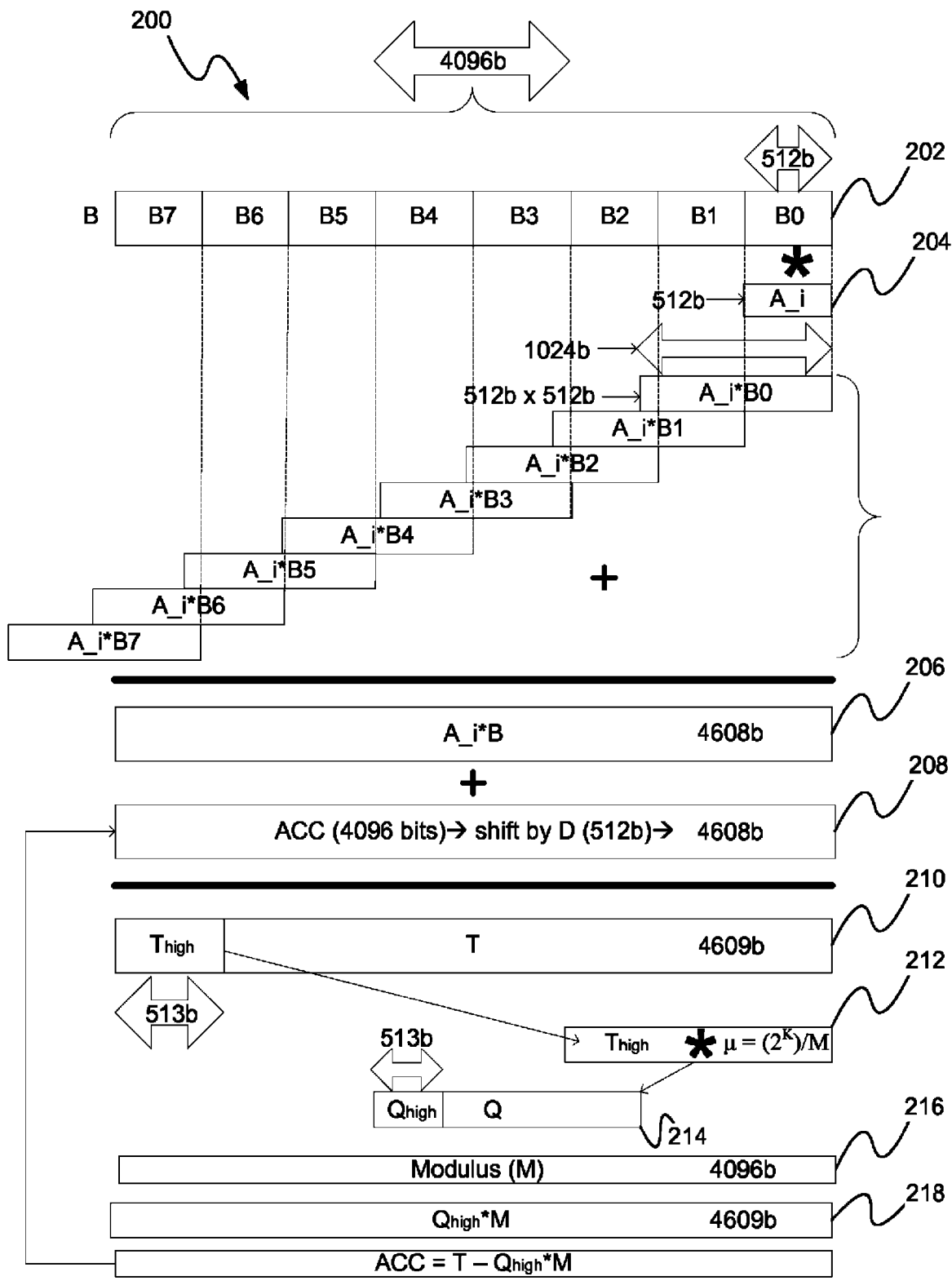
FIG. 2 is a diagram showing another exemplary embodiment in accordance with the present disclosure.

FIG. 2 shows an exemplary embodiment of a hardware accelerator 200 in accordance with the present disclosure. In some embodiments, hardware accelerator 200 may be configured to calculate the result of a modular multiplication operation (e.g., R=A*B mod M). This particular problem may be expressed as a series of polynomials that may be multiplied, reduced and combined with a factorization base (D) as shown below:

$$R = A * B \mod M \qquad \text{EQUATION 1}$$
$$= (a0 + a1*D + a2*D^2 + \ldots an*D^n) * B \mod M$$
$$= (a0*B + D(a1*B + D(a2*B + \ldots D$$
$$(an*B + (0))\ldots))) \mod M$$

Each term in the parentheses of Equation 1 may be reduced at each iteration modulo M, thus providing an efficient procedure for multiplication and reduction. The selection of factorization base (D) may control the size of the Barrett's Reduction parameter μ (described in further detail below), which may have a substantial impact upon the amount of storage space consumed. For example, the optimal size of D for a 4096 bit operand may be approximately $2^{512}$. The smaller the size of D, the more multiplications may be needed, however, less data register space may be required. Factorization base D multiplication may be performed via a right-shift and/or a left-shift operation. In some embodiments, the factorization base may be chosen to be at least as large as the multiplier word size of the processor and may also be a power of two.

Hardware accelerator 200 generally includes a first register 202, which may include a first polynomial and a second register 204, which may similarly include a second polynomial. In some embodiments, the first polynomial (e.g., B7-B0) may be a 4096 bit number divided into eight distinct 512 bit segments. Alternatively, second polynomial (e.g., A_i) may be a 512 bit number. The vector multiplication of A_i*B may be a 512 b by 4096 b multiplication, which may be decomposed into 8 separate 512 b by 512 b multiplications followed by the combined addition of partial products (e.g., A_i*B0+A_i*B1+A_i*B2 . . . etc). These base multiplications may be performed using a conventional multiplier and/or the hardware architecture described below. Further, prior to the addition of partial products a shifting operation may be performed. For example, A_i*B1 may be added in a start position shifted by 512 bits, A_i*B2 may be added in a position shifted by 2*512 bits, etc. A_i*B may generate a first product, which may be 4608 bits long in this example and may be stored in a third register 206. The parenthesized expressions (i.e., factorization operations) shown in Equation 1 above may be stored in a variable accumulator 208, which may be configured to store operands having various bit lengths. The process depicted in Equation 1 may begin at $a_n$ with accumulator 208 initialized to zero and may progress outward, repeating the process at each iteration. In some embodiments, accumulator 208 may have a bit length of 4096 bits.

The factorization base (D) may be applied to the contents of accumulator 208 and may be selected to produce a shift left of 512-bits, thus yielding a second product, which may be another 4608 bit number. In some embodiments the shifting operation may be performed using pointer addressing or other suitable methods. As expected, this shifting operation may correspond to the multiplication involving Factorization base D shown in Equation 1.

The first and second products (each 4608 bits in the current example) may be stored in second and third registers 206 and 208 and may be added to generate a first intermediate result T, which may be a 4609 bit number stored in a fourth register 210. Intermediate result T may be reduced modulo M, which may be performed using Barrett's reduction or a modified form of the same, which, in some embodiments, may require an additional 514 b multiplication in addition to the 8 separate 512 b multiplications. Barrett's reduction is a method of reducing one number modulo another number (e.g., x mod m) and may be used when using numbers implemented by multiple precision arithmetic libraries, such as the RSA cryptosystem, which may involve modular exponentiation upon large numbers (e.g., those exceeding 512 bits).

In this embodiment, μ may be calculated using the equation μ=$(2^K)$/M, where k=log(D)+the modulus size (i.e., 512+4096 or 4608). Here, μ may result in a 514 bit number. The 514 bit μ parameter may then be multiplied by the top 513 bits ($T_{high}$) of the first intermediate result stored in register 210 to generate a product Q, which may be stored in register 214. The 513 most significant bits of this product ($Q_{high}$) may be multiplied with a modulus, which may be stored in register 216, to generate a reduction product (e.g., $Q_{high}$*M), which may be stored in an additional register 218. The reduction product (e.g., $Q_{high}$*M) may be subtracted from the first intermediate result T (stored in fourth register 210) to generate a second intermediate result, which may be loaded into accumulator 208. In other words, referring again to Equation 1, accumulator 208 may then receive the next parenthesized expression (e.g., 4096 bits), thus repeating the process. Some or all of these multiplication operation may utilize a series of multiplies and subtracts similar to those described above between the first and second polynomials. An example of the pseudocode for this embodiment is shown below:

```
// Compute R = A*B mod M
ACC = 0;
For(i=7; i>=0; i--){
T = [ACC<<512] + a_i*B;
Q_high = 513 most-significant-bits of (T_high * μ)
ACC = T - Q_high*M
While (ACC > M) ACC = ACC - M
}
R = ACC
```

The embodiments described herein may utilize remaining Data RAM space to perform sliding or fixed exponent windowing, which may allow the system to optimize performance. An exponent windowing unit may calculate windows on long exponents for the purpose of reducing the number of multiplications required in modular exponentiation. In exponent windowing, the exponent may be treated as a binary string and the bits may be scanned in either a left to right or right to left orientation. The left-to-right approach may be improved by grouping the exponent bits into k-bit sections. This approach may scan the bits of the exponent to determine the next group (i.e., window) to be multiplied as the exponent slides from left to right. This exponent windowing approach may be used in accordance with any or all of the embodiments described herein to further enhance system performance.

Figure 3:
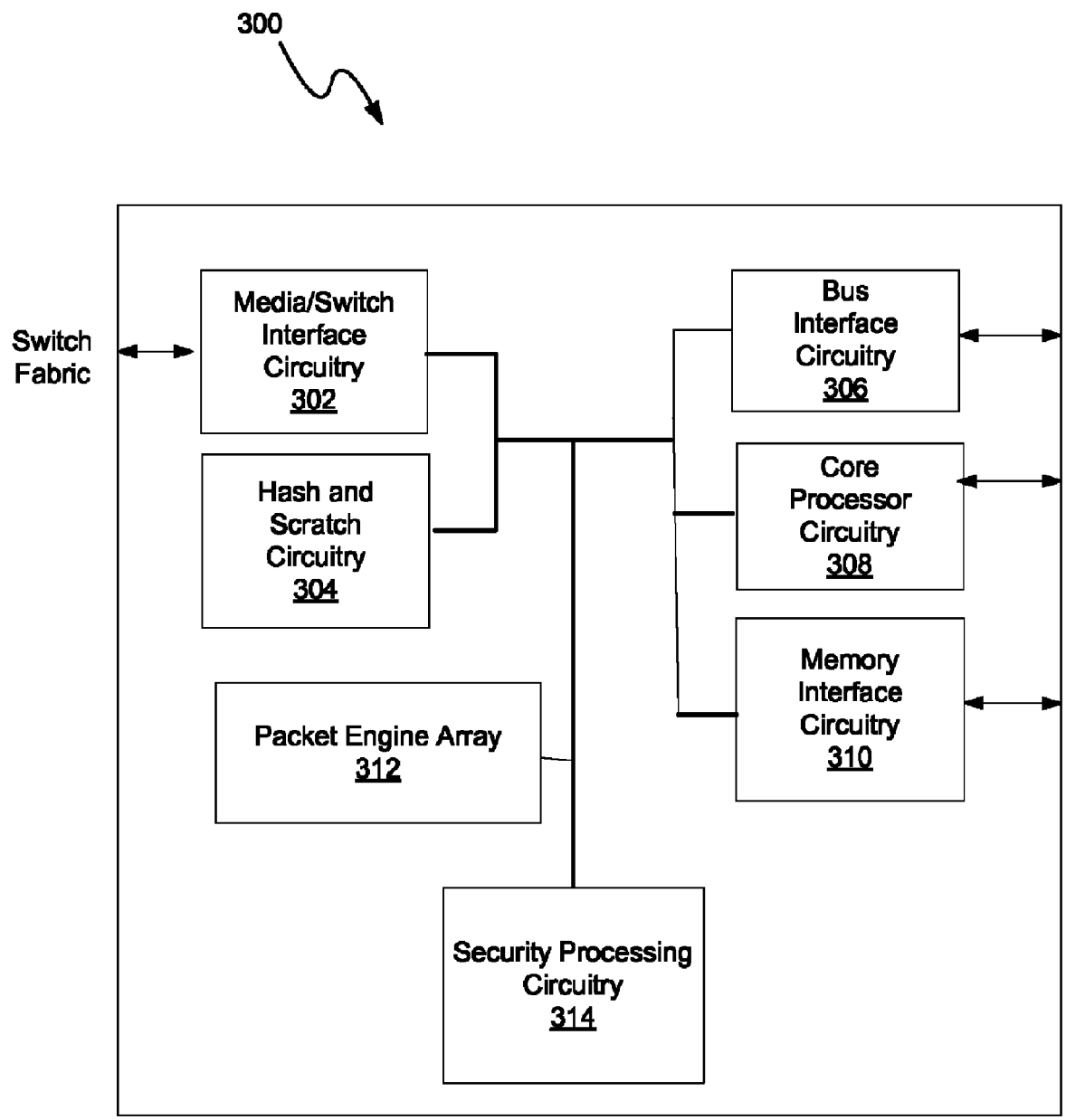
FIG. 3 is a block diagram depicting portions of a network processor in accordance with one embodiment of the present disclosure.

The methodology of FIGS. 1 and 2 may be implemented, for example, in a variety of multi-threaded processing environments. For example, FIG. 3 is a diagram illustrating one exemplary integrated circuit embodiment (IC) 300, which may be configured to perform the method of FIG. 1 and/or may include the circuitry described in FIG. 2. "Integrated circuit", as used in any embodiment herein, means a semiconductor device and/or microelectronic device, such as, for example, but not limited to, a semiconductor integrated circuit chip. The IC 300 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 300 may include media/switch interface circuitry 302 (e.g., a CSIX interface) capable of sending and receiving data to and from devices connected to the integrated circuit such as physical or link layer devices, a switch fabric, or other processors or circuitry. The IC 300 may also include hash and scratch circuitry 304 that may execute, for example, polynomial division (e.g., 48-bit, 64-bit, 128-bit, etc.), which may be used during some packet processing operations. The IC 300 may also include bus interface circuitry 306 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 300 or external memory. The IC may also include core processor circuitry 308. In this embodiment, core processor circuitry 308 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 308 may comprise other types of processor core circuitry without departing from this embodiment. Core processor circuitry 308 may perform "control plane" tasks and management tasks (e.g., look-up table maintenance, etc.). Alternatively or additionally, core processor circuitry 308 may perform "data plane" tasks (which may be typically performed by the packet engines included in the packet engine array 318, described below) and may provide additional packet processing threads.

Integrated circuit 300 may also include a packet engine array 312. The packet engine array may include a plurality of packet engines. Each packet engine may provide multithreading capability for executing instructions from an instruction set, such as a reduced instruction set computing (RISC) architecture. Each packet engine in the array 312 may be capable of executing processes such as packet verifying, packet classifying, packet forwarding, and so forth, while leaving more complicated processing to the core processor circuitry 308. Each packet engine in the array 312 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 300 may also include memory interface circuitry 310. Memory interface circuitry 310 may control read/write access to external memory. Machine readable firmware program instructions may be stored in external memory, and/or other memory internal to the IC 300. These instructions may be accessed and executed by the integrated circuit 300. When executed by the integrated circuit 300, these instructions may result in the integrated circuit 300 performing the operations described herein as being performed by the integrated circuit, for example, operations described above with reference to FIGS. 1-2.

Figure 4:
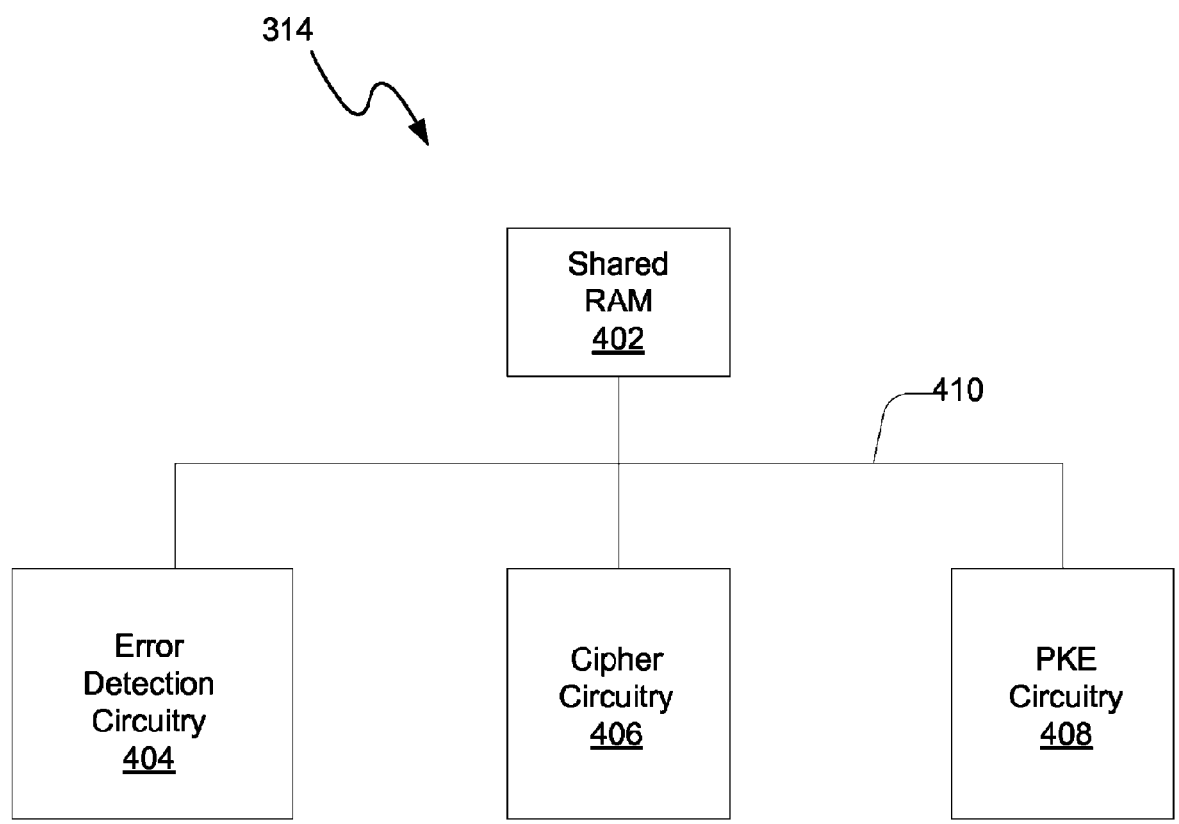
FIG. 4 is a block diagram showing further detail of a security processor in accordance with an embodiment of the present disclosure.

IC 300 may further include security processing circuitry 314. Security processor circuitry 314 may be configured to perform encryption and/or decryption operations which may include modular exponentiation operations (as described above with reference to FIGS. 1 and/or 2) for generating a public key. Referring now to FIG. 4, security processing circuitry 314 may include shared RAM 402 operatively connected to error detection circuitry 404, cipher circuitry 406 and public key encryption (PKE) circuitry 408 through internal bus 410. Error detection circuitry 404 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 314 may include both private and public key modules. Cipher circuitry 406 may be configured to generate private keys, which may include execution of symmetric and/or private-key data encryption algorithm such as the data encryption standard (DES) or advanced encryption standard (AES).

PKE circuitry 408 may be configured to execute an asymmetric key encryption algorithm and may include generating a public-key/private-key pair.

Figure 5:
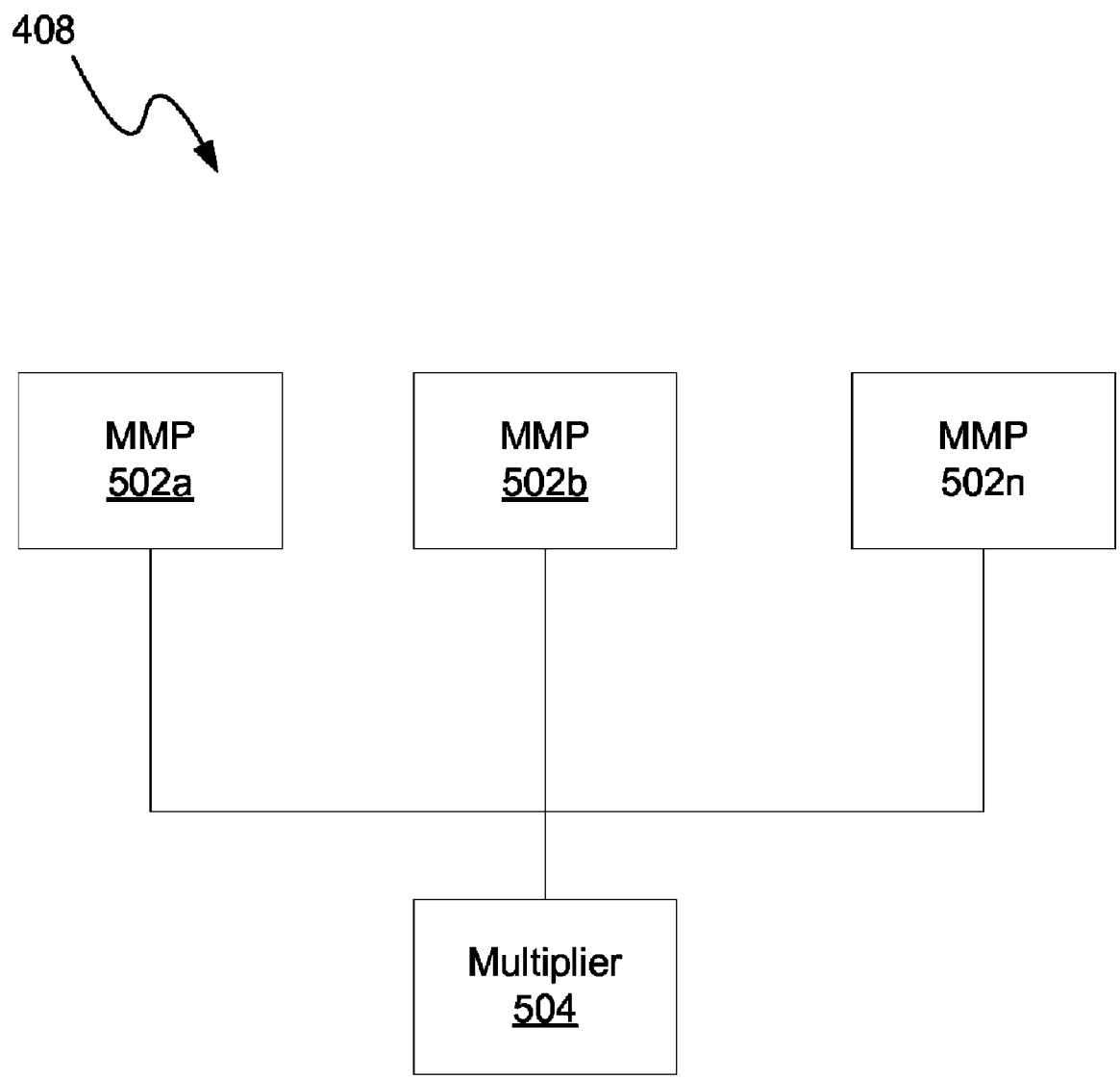
FIG. 5 is a block diagram showing encryption circuitry in accordance with an embodiment of the present disclosure.

One embodiment of PKE circuitry 408 is shown in FIG. 5. PKE circuitry 408 may include a plurality of modular math processors (MMPs) 502a, 502b, . . . , 502n. Each MMP may include at least one arithmetic logic unit (ALU) configured to perform vector operations. MMPs 502 may include a control store for the operations described herein as well as large register files configured to store operands, temporary variables and final results. PKE circuitry 408 may further include a multiplier 504 operatively connected to modular math processors. In at least one embodiment embodiments, multiplier 504 may be a large (e.g., 515×515) unsigned integer multiplier. PKE circuitry 408 may be used in accordance with the present disclosure to perform the mathematical operations and execute the methods described above with reference to FIGS. 1 and/or 2.

Figure 6:
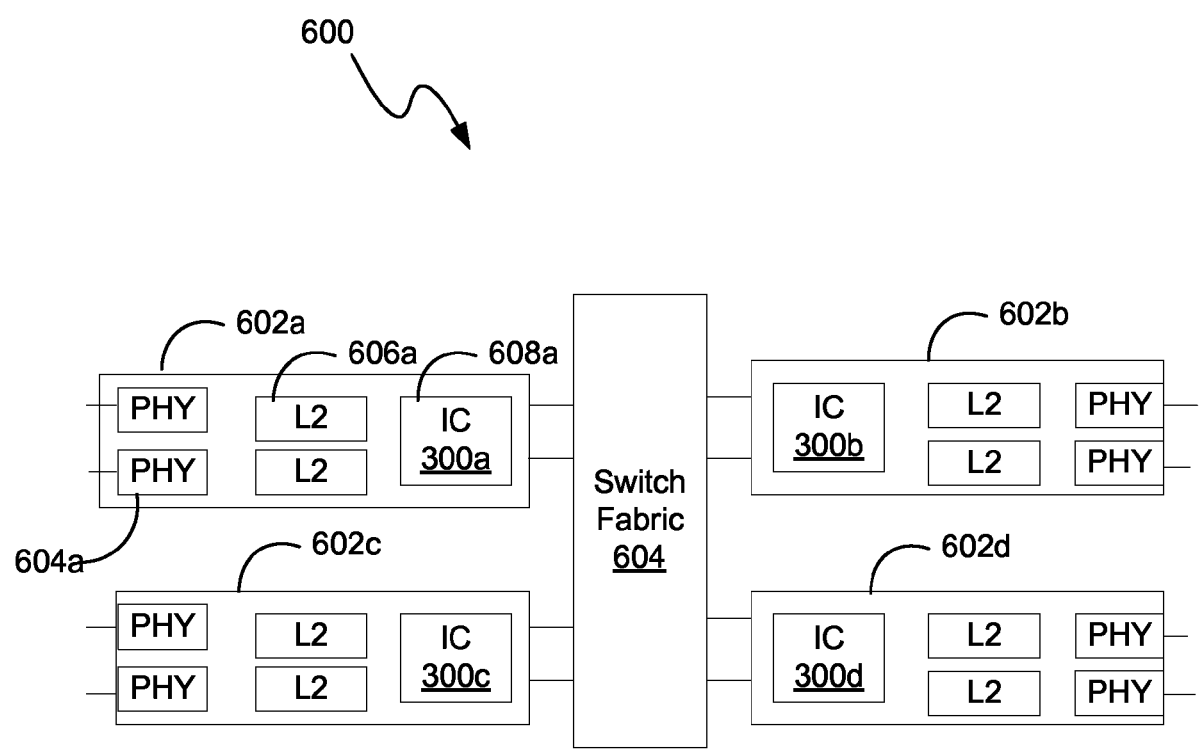
FIG. 6 is a diagram illustrating one exemplary system embodiment.

FIG. 6 depicts one exemplary system embodiment 600. This embodiment may include a collection of line cards 602a, 602b, 602c and 602d ("blades") interconnected by a switch fabric 604 (e.g., a crossbar or shared memory switch fabric). The switch fabric 604, for example, may conform to CSIX or other fabric technologies such as HyperTransport, Infiniband, PCI-X, Packet-Over-SONET, RapidIO, and Utopia. Individual line cards (e.g., 602a) may include one or more physical layer (PHY) devices 604a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 300a, which may include network processors, and may be embodied as integrated circuit packages (e.g., ASICs). In addition to the operations described above with reference to FIG. 1, integrated circuit 300a may also include hardware accelerator 200 as described above with reference to FIG. 2.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In alternate embodiments, the embodiment of FIGS. 3, 4, 5, and/or 6 may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above with reference to FIGS. 1 and/or 2 may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Accordingly, at least one embodiment described herein may provide a method for modular exponentiation. The method may include dividing a first polynomial into a plurality of segments and generating a first product by multiplying the plurality of segments of the first polynomial with a second polynomial. The method may also include generating a second product by shifting the contents of an accumulator with a factorization base. The method may further include adding the first product and the second product to yield a first intermediate result and reducing the first intermediate result to yield a second intermediate result. The method may also include generating a public key based on, at least in part, the second intermediate result.

The embodiments described herein may provide numerous advantages over the prior art. The amount of area required to implement any or all of the aforementioned operations may be reduced using the techniques described herein. For example, the size of PKE circuitry 408 may be substantially reduced using the teachings of the present disclosure. Further, the embodiments described herein are easily extendable to general purpose processors, which may use a similar or an alternative factorization base size (e.g. 64 bits). Moreover, the embodiments described herein may be optimized to work on a wide range of key sizes including, but not limited to, 1024, 2048, 3096, 4096, 8192 bits.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method for modular exponentiation, comprising:
dividing, via circuitry, a first polynomial into a plurality of segments;
generating, via the circuitry, a first product by multiplying the plurality of segments of the first polynomial with a second polynomial;
generating, via the circuitry, a second product by shifting the contents of an accumulator with a factorization base having a bit length of D, wherein D is selected to be approximately equal to the bit length of a segment of the first polynomial so that the second product is limited to the bit length of the contents of the accumulator plus D;
adding, via the circuitry, the first product and the second product to yield a first intermediate result;
reducing, via the circuitry, the first intermediate result to yield a second intermediate result; and
generating, via the circuitry, a public key based on, at least in part, the second intermediate result.

2. The method of claim 1, further comprising:
iteratively repeating generating a second product by shifting, adding the first product and the second product and reducing the first intermediate result, until a final result is obtained.

3. The method of claim 1, wherein:
reducing the first intermediate result is performed using Barrett's Reduction, modified Barrett's Reduction and/or a Karatsuba-Ofman process.

4. The method of claim 1, wherein:
generating a second product by shifting the contents of an accumulator with a factorization base includes a left-shift operation.

5. The method of claim 1, further comprising:
selecting a factorization base at least as large as the word size of a multiplier.

6. The method of claim 1, wherein:
generating a first product by multiplying a first polynomial and a second polynomial includes adding partial products.

7. The method of claim 1, wherein:
the plurality of segments of the first polynomial are of equal length.

8. An apparatus, comprising:
an integrated circuit (IC) configured to divide a first polynomial into a plurality of segments; the IC further configured to generate a first product by multiplying the plurality of segments of the first polynomial with a second polynomial; the IC further configured to generate a second product by shifting the contents of an accumulator with a factorization base having a bit length of D, wherein D is selected to be approximately equal to the bit length of a segment of the first polynomial so that the second product is limited to the bit length of the contents of the accumulator plus D; the IC further configured to add the first product and the second product to yield a first intermediate result and to reduce the first intermediate result to yield a second intermediate result; the IC further configured to generate a public key, based on, at least in part, the second intermediate result.

9. The apparatus of claim 8, wherein:
the IC is configured to iteratively repeat generating a second product by shifting, adding the first product and the second product and reducing the first intermediate result, until a final result is obtained.

10. The apparatus of claim 8, wherein:
the first intermediate result is reduced using Barrett's Reduction, modified Barrett's Reduction and/or a Karatsuba-Ofman implementation.

11. The apparatus of claim 8, wherein:
the IC is configured to perform a left-shift operation to generate the second product.

12. The apparatus of claim 8, wherein:
the factorization base is selected to be at least as large as the word size of a multiplier.

13. The apparatus of claim 8, wherein:
the IC is configured to add partial products in order to generate a first product.

14. An article comprising a computer-readable non-transitory storage medium having stored thereon instructions that when executed by a machine perform the following operations comprising: dividing a first polynomial into a plurality of segments; generating a first product by multiplying the plurality of segments of the first polynomial with a second polynomial; generating a second product by shifting the contents of an accumulator with a factorization base having a bit length of D, wherein D is selected to be approximately equal to the length of the bit length of a segment of the first polynomial so that the second product is limited to the bit length of the contents of the accumulator plus D; adding the first product and the second product to yield a first intermediate result; reducing the first intermediate result to yield a second intermediate result; and generating a public key based on, at least in part, the second intermediate result.

15. The article of claim 14, further comprising:
iteratively repeating generating a second product by shifting, adding the first product and the second product and reducing the first intermediate result, until a final result is obtained.

16. The article of claim 14, wherein:
reducing the first intermediate result is performed using Barrett's Reduction, modified Barrett's Reduction and/ or a Karatsuba-Ofman implementation.

17. The article of claim 14, wherein:
generating a second product by shifting the contents of an accumulator with a factorization base includes a left-shift operation.

18. The article of claim 14, further comprising:
selecting a factorization base at least as large as the word size of a multiplier.

19. The article of claim 14, wherein:
generating a first product by multiplying a first polynomial and a second polynomial includes adding partial products.

20. The article of claim 14, wherein:
the plurality of segments of the first polynomial are of equal length.

21. A system comprising:
a plurality of line cards and a switch fabric interconnecting said plurality of line cards, at least one line card comprising:
at least one physical layer component (PHY); and
an integrated circuit (IC) configured to divide a first polynomial into a plurality of segments; the IC further configured to generate a first product by multiplying the plurality of segments of the first polynomial with a second polynomial; the IC further configured to generate a second product by shifting the contents of an accumulator with a factorization base having a bit length of D, wherein D is selected to be approximately equal to the bit length of a segment of the first polynomial so that the second product is limited to the bit length of the contents of the accumulator plus D; the IC further configured to add the first product and the second product to yield a first intermediate result and to reduce the first intermediate result to yield a second intermediate result; the IC further configured to generate a public key, based on, at least in part, the second intermediate result.

22. The system according to claim 21, wherein:
the IC is configured to iteratively repeat generating a second product by shifting, adding the first product and the second product and reducing the first intermediate result, until a final result is obtained.

* * * * *